US012749738B2

(12) United States Patent

Aikawa et al.

(10) Patent No.: US 12,749,738 B2

(45) Date of Patent: Sep. 29, 2026

(54) THERMAL MANAGEMENT CIRCUIT

(71) Applicant: TOYOTA JIDOSHA KABUSHIKI KAISHA, Toyota (JP)

(72) Inventors: Hidefumi Aikawa, Okazaki (JP); Makoto Ikegami, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 147 days.

(21) Appl. No.: 18/757,943

(22) Filed: Jun. 28, 2024

(65) Prior Publication Data

US 2025/0112298 A1 Apr. 3, 2025

(30) Foreign Application Priority Data

Oct. 2, 2023 (JP) ................................ 2023-171329

(51) Int. Cl.

| | |
|---|---|
| ***H01M 10/66*** | (2014.01) |
| ***B60H 1/00*** | (2006.01) |
| ***B60H 1/14*** | (2006.01) |
| ***B60H 1/32*** | (2006.01) |
| ***B60L 58/26*** | (2019.01) |
| ***H01M 10/613*** | (2014.01) |
| ***H01M 10/6569*** | (2014.01) |

(52) U.S. Cl.

CPC ........ *H01M 10/66* (2015.04); *B60H 1/00278* (2013.01); *B60H 1/143* (2013.01); *B60H 1/32284* (2019.05); *H01M 10/613* (2015.04); *H01M 10/6569* (2015.04); *B60H 2001/00307* (2013.01); *B60L 58/26* (2019.02); *H01M 2220/20* (2013.01)

(58) Field of Classification Search

CPC ......... H01M 2220/20; H01M 10/6569; H01M 10/613; H01M 10/66; B60L 58/26; B60H 2001/00307; B60H 1/32284; B60H 1/143; B60H 1/00278

See application file for complete search history.

(56) References Cited

U.S. PATENT DOCUMENTS

| | | | | |
|---|---|---|---|---|
| 2021/0300154 | A1 * | 9/2021 | Hasegawa ............ | B60H 1/2215 |
| 2022/0069387 | A1 | 3/2022 | Maeda et al. | |

FOREIGN PATENT DOCUMENTS

| | | | | |
|---|---|---|---|---|
| JP | 2005186879 | A * | 7/2005 | |
| JP | 2006-199206 | A | 8/2006 | |
| JP | 4323307 | B2 | 9/2009 | |
| JP | 2020-185880 | A | 11/2020 | |

* cited by examiner

*Primary Examiner* — Ana M Vazquez

(74) *Attorney, Agent, or Firm* — SoraIP, Inc.

(57) ABSTRACT

The thermal management circuit includes a battery circuit (first circuit), a refrigeration cycle, and a heat dissipation circuit (second circuit). The heat dissipation circuit includes a flow path (first flow path), a flow path (second flow path), and a flow path (third flow path). The flow path connects the port (outlet port) of the condensing portion and the upstream-side HT radiator (upstream-side radiator). The flow path branches from a flow path connecting the upstream-side HT radiator and the downstream-side HT radiator (downstream-side radiator), and is connected to a port (inlet port) of the condensing portion. The flow path connects a port (inlet port) of the subcooling unit (super-cooling portion) to the downstream-side HT radiator.

2 Claims, 7 Drawing Sheets

THERMAL MANAGEMENT CIRCUIT

CROSS-REFERENCE TO RELATED APPLICATION

This application claims priority to Japanese Patent Application No. 2023-171329 filed on Oct. 2, 2023, incorporated herein by reference in its entirety.

BACKGROUND

1. Technical Field

The present disclosure relates to a thermal management circuit.

2. Description of Related Art

Japanese Unexamined Patent Application Publication No. 2005-186879 (JP 2005-186879 A) discloses a configuration in which coolant of an engine is cooled by a radiator.

SUMMARY

In the thermal management circuit according to the above JP 2005-186879 A, cooling fluid for cooling the engine (cooling object equipment) is cooled by the radiator. There is desire to further improve efficiency of cooling the cooling object equipment using a radiator.

The present disclosure has been made in order to solve the above problem, and an object thereof is to provide a thermal management circuit capable of improving efficiency of cooling the cooling object equipment using a radiator.

A thermal management circuit according to an aspect of the present disclosure is a thermal management circuit installed in electrical equipment, the thermal management circuit including a first circuit, through which flows a cooling fluid that is subjected to heat exchange with cooling-object equipment that is equipment to be cooled, a refrigeration cycle including a chiller and a water-cooled condenser, and also through which flows a refrigerant that is subjected to heat exchange in the chiller with the cooling fluid flowing through the first circuit, and a second circuit including a radiator portion, and also through which flows a cooling fluid that is subjected to heat exchange in the water-cooled condenser with the refrigerant flowing through the refrigeration cycle. The second circuit includes a first flow path, a second flow path, and a third flow path, each connected to the water-cooled condenser. The water-cooled condenser includes a condensing portion and a supercooling portion. The radiator portion includes an upstream-side radiator and a downstream-side radiator that are connected in series with each other in the second circuit. The first flow path connects an outlet port of the cooling fluid in the condensing portion, and the upstream-side radiator. The second flow path branches from a flow path connecting the upstream-side radiator and the downstream-side radiator, and connects to an inlet port of the cooling fluid in the condensing portion. The third flow path connects an inlet port of the cooling fluid in the supercooling portion, and the downstream-side radiator.

In the thermal management circuit according to an aspect of the present disclosure, as described above, the first flow path connects the outlet port of the cooling fluid in the condensing portion and the upstream-side radiator, the second flow path branches from the flow path connecting the upstream-side radiator and the downstream-side radiator, and is connected to the inlet port of the cooling fluid in the condensing portion, and the third flow path connects the inlet port of the cooling fluid in the supercooling portion and the downstream-side radiator. Thus, the cooling fluid flowing out from the upstream-side radiator can directly flow into the condensing portion through the second flow path. As a result, the cooling fluid can be made to flow to the condensing portion without passing through the downstream-side radiator and the supercooling portion. Consequently, flow rate (flow momentum, flow velocity) of the cooling fluid does not decrease due to passing through the downstream-side radiator and the supercooling portion, and accordingly the flow rate of the cooling fluid flowing into the condensing portion from the second flow path can be increased relatively. Note that the refrigerant changes from gas to liquid in the condensing portion, and accordingly, while condensed heat is dissipated from the refrigerant, temperature of the refrigerant hardly changes (decreases). Thus, the temperature of the refrigerant is maintained at a relatively high value, and accordingly heat exchange is performed with the refrigerant even when the cooling fluid has a relatively high temperature, due to having passed through just the upstream-side radiator, without having passed through the downstream-side radiator. Also, the flow rate of the cooling fluid passing through the condensing portion is great, and accordingly increase in the temperature of the cooling fluid due to passing through the condensing portion is suppressed. Thus, decrease in the amount of heat exchange between the refrigerant and the cooling fluid can be suppressed. In these respects, the above-described configuration of the thermal management circuit is effective in increasing the amount of heat exchange at the condensing portion.

Also, the cooling fluid that has passed through the upstream-side radiator and the downstream-side radiator can be caused to flow into the supercooling portion. Thus, the temperature of the cooling fluid flowing into the supercooling portion can be made to be lower as compared to when the cooling fluid passes only through the upstream-side radiator. Note that the refrigerant remains in the liquid state in the supercooling portion, and accordingly the temperature of the refrigerant decreases due to heat dissipation. Therefore, the lower the temperature of the cooling fluid regarding which heat exchange is performed with the refrigerant is, the greater the amount of heat exchange performed in the supercooling portion can made to be. In this respect, the above-described configuration of the thermal management circuit is effective in increasing the amount of heat exchange in the supercooling portion.

As a result of the above, the amount of heat exchange between the refrigerant and the cooling fluid in the water-cooled condenser (the amount of heat dissipation of the refrigerant) can be increased, and accordingly the cooling efficiency of the cooling object equipment can be easily improved.

In the thermal management circuit according to the above aspect, preferably, the downstream-side radiator is disposed upstream from the upstream-side radiator in a flow direction of outside air flowing into the radiator portion. According to this configuration, the outside air passes through the downstream-side radiator before passing through the upstream-side radiator, and accordingly the temperature of the outside air passing through the downstream-side radiator can be made to be relatively low. As a result, the amount of heat dissipation of the cooling fluid in the downstream-side radiator can be increased. Thus, the amount of heat dissipation of the refrigerant in the supercooling portion can be increased.

In the thermal management circuit according to the above aspect, preferably, the second circuit includes a fourth flow path connecting the first flow path, the second flow path or the third flow path. Further, the second circuit includes a heater core provided on the fourth flow path, and a first valve provided on the first flow path. The first valve is configured to adjust a flow rate of a coolant flowing to the upstream-side radiator and a flow rate of the coolant flowing to the heater core. According to this configuration, balance between the amount of heat dissipation of the cooling fluid in the radiator portion and the amount of heat dissipation of the cooling fluid in the heater core (i.e., heating performance) can be adjusted by the first valve.

In this case, preferably, the second circuit includes a second valve configured to adjust a flow rate of the coolant flowing from the upstream-side radiator to the downstream-side radiator. According to this configuration, balance can be adjusted between the flow rate of the coolant flowing through the downstream-side radiator and the flow rate of the coolant flowing into the condensing portion through the second flow path. This enables adjustment of balance between the amount of heat dissipation of the coolant in the downstream-side radiator and the amount of heat dissipation from the refrigerant to the cooling fluid in the condensing portion.

In the thermal management circuit in which the second circuit includes the second valve, preferably, the second valve is integrally fashioned with the first valve. According to this configuration, the number of components can be reduced and also the configuration of the thermal management circuit can be simplified, in comparison with when the second valve and the first valve are provided separately.

According to the present disclosure, cooling efficiency of cooling object equipment using a radiator can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
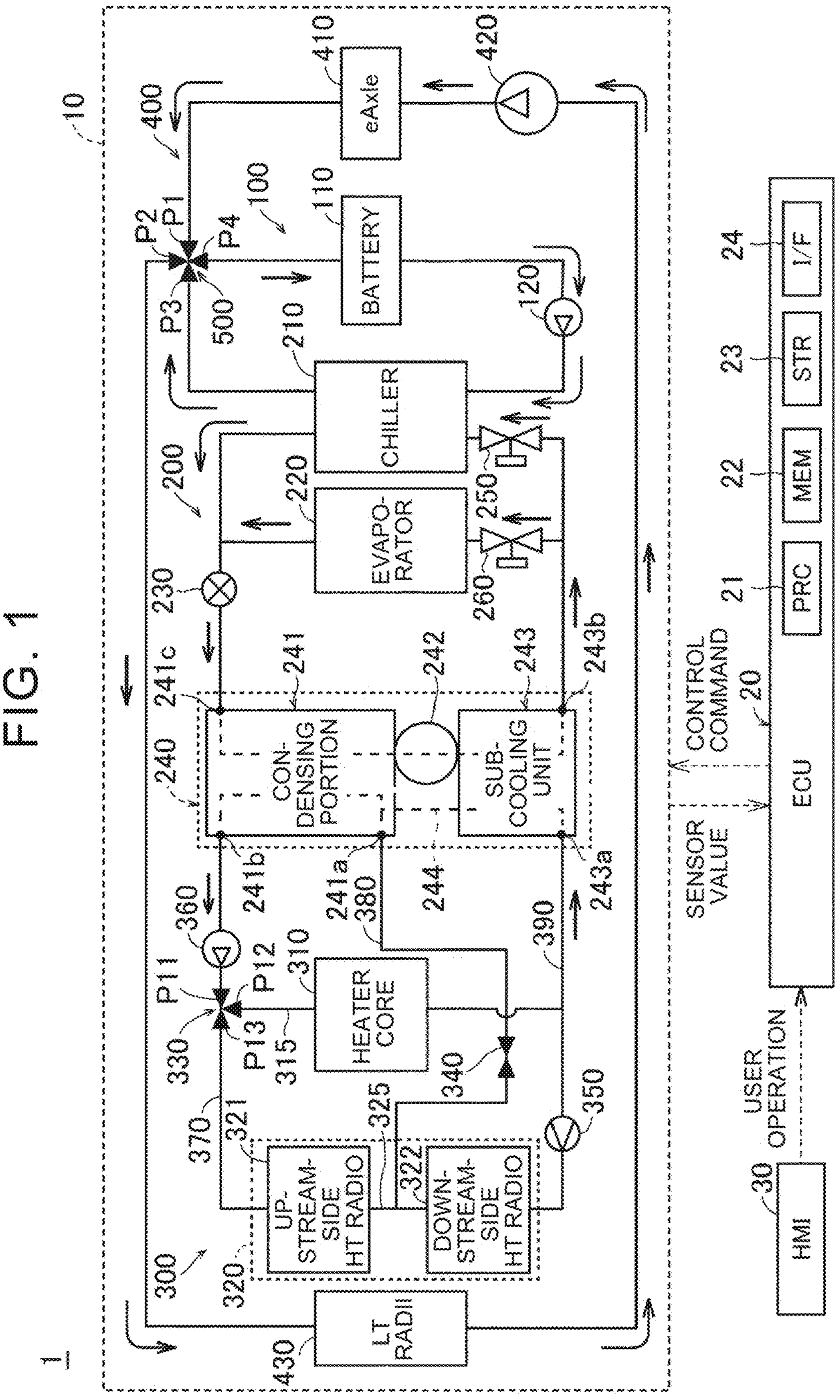
FIG. 1 is a diagram illustrating a configuration of a thermal management system according to an embodiment.

Hereinafter, embodiments of the present disclosure will be described in detail with reference to the drawings. It should be noted that the same or corresponding portions in the drawings are designated by the same reference signs and repetitive description will be omitted.

FIG. 1 is a diagram illustrating an overall configuration of a thermal management system 1 including a thermal management circuit 10 according to the present embodiment. The thermal management system 1 includes a thermal management circuit 10 and an electronic control unit (ECU) 20 and HMI (Human Machine Interface) 30.

Figure 2:
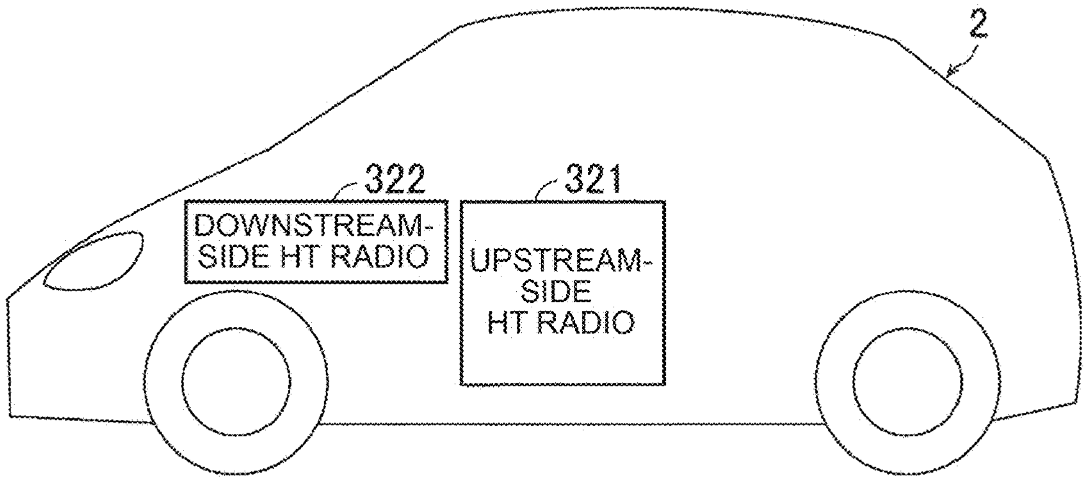
FIG. 2 is a diagram illustrating an electrified vehicle in which a thermal management system according to an embodiment is mounted.

The thermal management system 1 is mounted on, for example, an electrified vehicle 2 (see FIG. 2). Note that electrified vehicle 2 is an exemplary "electrical equipment" of the present disclosure.

The thermal management circuit 10 includes a battery circuit 100, a refrigeration cycle 200, a heat dissipation circuit 300, a low-temperature circuit 400, and a four-way valve 500. In the present specification, the heat medium flowing in the refrigeration cycle 200 is referred to as a "refrigerant", and the heat medium flowing in the other circuits (100, 300, 400) is referred to as a "cooling fluid". The battery circuit 100 and the heat dissipation circuit 300 are examples of the "first circuit" and the "second circuit" of the present disclosure, respectively.

The battery circuit 100 includes a battery 110 and a water pump 120. In the battery circuit 100, a cooling fluid that exchanges heat with the battery 110 flows. The battery 110 stores electric power used for traveling of electrified vehicle 2 or the like. Note that the battery 110 is an example of a "cooling target equipment" of the present disclosure.

The refrigeration cycle 200 includes a chiller 210, an evaporator 220, a compressor 230, a water-cooled condenser 240, an expansion valve 250, and an expansion valve 260.

The chiller 210 is connected to a flow path of each of the refrigeration cycle 200 and the battery circuit 100. As a result, the refrigerant flowing through the refrigeration cycle 200 and the cooling fluid flowing through the battery circuit 100 are heat-exchanged in the chiller 210.

The refrigerant (gas phase refrigerant or liquid phase refrigerant) circulating in the refrigeration cycle 200 flows through one/both of the first path of the compressor 230-water-cooled condenser 240-expansion valve 260-evaporator 220-compressor 230 and the second path of the compressor 230-water-cooled condenser 240-expansion valve 250-chiller 210-compressor 230.

The water-cooled condenser 240 includes a condensing portion 241, a receiver 242, a subcooling unit 243, and a flow pipe 244. The condensing portion 241, the receiver 242, and the subcooling unit 243 are connected in series with each other in the refrigeration cycle 200 (in the flow path of the refrigerant flowing through the refrigeration cycle 200). The refrigerant in the refrigeration cycle 200 flows in the order of the condensing portion 241, the receiver 242, and the subcooling unit 243. Note that the subcooling unit 243 is an example of a "supercooling portion" of the present disclosure.

The condensing portion 241 condenses the high-temperature and high-pressure gas refrigerant pumped from the compressor 230 to be converted into a liquid refrigerant, and exchanges heat between the liquid refrigerant and the cooling fluid flowing through the heat dissipation circuit 300. The receiver 242 performs gas-liquid separation of the liquid-phase refrigerant that has passed through the condensing portion 241. The subcooling unit 243 exchanges heat between the liquid-phase refrigerant that has passed through the receiver 242 and the cooling fluid that flows through the heat dissipation circuit 300.

The condensing portion 241 includes a port 241*a*, a port 241*b*, and a port 241*c*. The port 241*a* is an inlet port through which the cooling fluid of the heat dissipation circuit 300 flows. The port 241*b* is an outlet port through which the cooling fluid flows out of the heat dissipation circuit 300. The port 241*c* is an inlet port into which the gaseous refrigerant of the refrigeration cycle 200 pumped from the compressor 230 flows.

The subcooling unit 243 includes a port 243*a* and a port 243*b*. The port 243*a* is an inlet port through which the cooling fluid of the heat dissipation circuit 300 flows. The port 243*b* is an outlet port through which the refrigerant of the refrigeration cycle 200 flows out.

The flow pipe 244 connects the subcooling unit 243 and the condensing portion 241. The cooling fluid in the heat dissipation circuit 300 flows from the subcooling unit 243 to the condensing portion 241 through the flow pipe 244.

The low-temperature circuit 400 includes an eAxle 410, a water pump 420, and a LT (Low Temperature) radiator 430. In the low-temperature circuit 400, a cooling fluid that is heat-exchanged with the eAxle 410 flows. The eAxle 410 includes a PCU (Power Control Unit) (not shown), an oil cooler, and the like.

The four-way valve 500 has ports P1 to P4. The port P1 is an inlet port into which the cooling fluid that has been heat-exchanged with the eAxle 410 flows. The port P2 is an outlet port through which the cooling fluid flows toward LT radiator 430. The port P3 is an inlet port through which the cooling fluid (the cooling fluid having passed through the chiller 210) in the battery circuit 100 flows. The port P4 is an outlet port through which the cooling fluid flows out to the battery circuit 100 (toward the battery 110).

ECU 20 controls the thermal management circuit 10. ECU 20 includes a processor 21, a memory 22, a storage 23, and an interface 24. ECU 20 controls the opening and closing of the respective ports of the four-way valve 500. By switching the open/close state of each port of the four-way valve 500, the flow path of the cooling fluid is switched.

Here, in the conventional thermal management circuit, it is desired to further improve the cooling efficiency of a cooling target equipment such as a battery.

Figure 3:
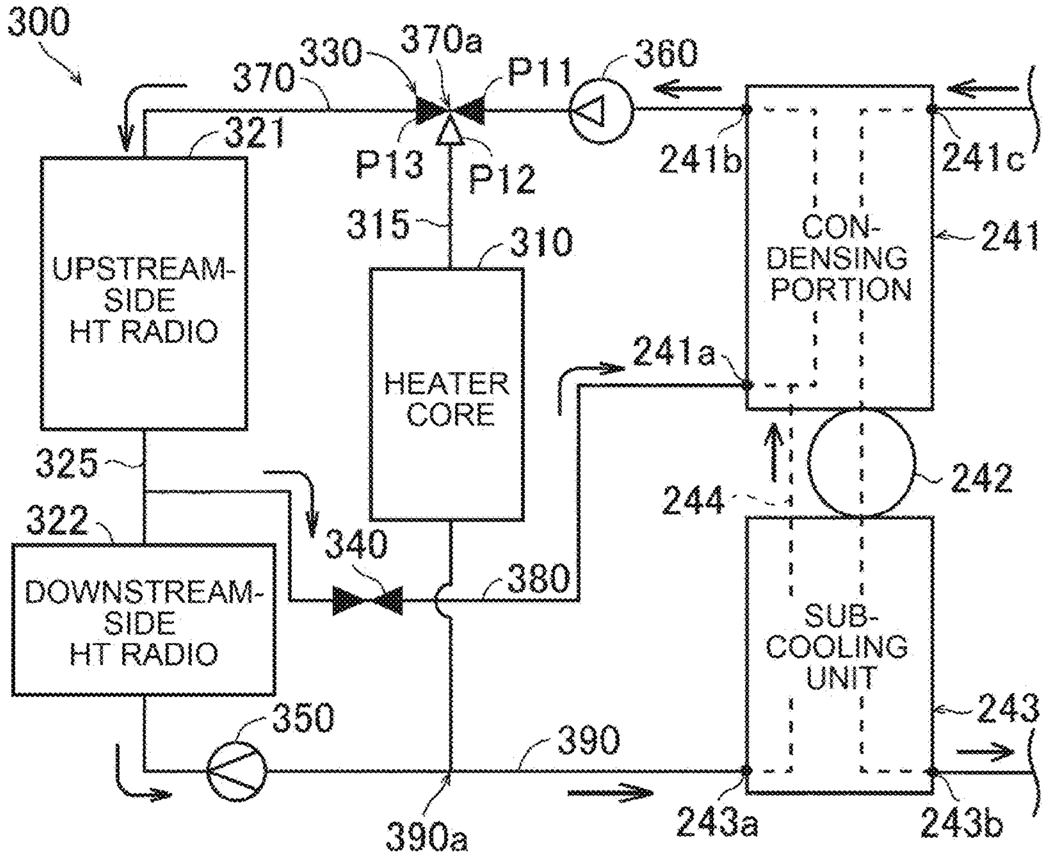
FIG. 3 is a diagram illustrating a first flow pattern of a heat dissipation circuit in a thermal management circuit according to an embodiment.

Therefore, in the present embodiment, the heat dissipation circuit 300 having the following configuration is used. A description will be given with reference to FIG. 3. FIG. 3 shows a first flow pattern of the cooling fluid in the heat dissipation circuit 300.

The heat dissipation circuit 300 includes a heater core 310, a radiator portion 320 (see FIG. 1), a three-way valve 330, a valve 340, a check valve 350, and a water pump 360. The flow rate (output) of the coolant by the water pump 360 and the respective states of the three-way valve 330 and the valve 340 are controlled by ECU 20 (see FIG. 1). The three-way valve 330 and the valve 340 are examples of the "first valve" and the "second valve", respectively. The check valve 350 is an example of a "second valve" of the present disclosure.

The radiator portion 320 includes an upstream-side HT (High Temperature) radiator 321, a downstream-side HT radiator 322, and a flow path 325. The upstream-side HT radiator 321 and the downstream-side HT radiator 322 are connected in series with each other in the heat dissipation circuit 300. The flow path 325 connects the upstream-side HT radiator 321 and the downstream-side HT radiator 322. The upstream-side HT radiator 321 is disposed upstream of the downstream-side HT radiator 322 in the flow direction of the cooling fluid in the heat dissipation circuit 300. The upstream-side HT radiator 321 and the downstream-side HT radiator 322 are exemplary of the "upstream-side radiator" and the "downstream-side radiator", respectively.

The heat dissipation circuit 300 includes a flow path 315, a flow path 370, a flow path 380, and a flow path 390. Each of the flow path 370, the flow path 380, and the flow path 390 connects the radiator portion 320 and the water-cooled condenser 240. The flow path 370 and the flow path 380 are examples of the "first flow path" and the "second flow path" of the present disclosure, respectively. The flow path 390 and the flow path 315 are examples of the "third flow path" and the "fourth flow path" of the present disclosure, respectively.

Specifically, the flow path 370 connects the port 241*b* of the condensing portion 241 and the upstream-side HT radiator 321. The flow path 380 is branched from the flow path 325 connecting the upstream-side HT radiator 321 and the downstream-side HT radiator 322, and is connected to the port 241*a* of the condensing portion 241. The flow path 390 connects the port 243*a* of the subcooling unit 243 and the downstream-side HT radiator 322.

The flow path 315 connects the partial 370*a* in the flow path 370 and the partial 390*a* in the flow path 390. The three-way valve 330 is provided in the partial 370*a*. The flow path 315 is provided with a heater core 310.

The three-way valve 330 has ports P11 to P13. The port P11 is an inlet port into which the cooling fluid from the condensing portion 241 flows. The port P12 is an outlet port through which the cooling fluid flows out to the flow path 315 toward the heater core 310. The port P13 is an outlet port through which the cooling fluid flows toward the upstream-side HT radiator 321. Each of the ports P11 and P13 is connected to the flow path 370. The port P12 is connected to the flow path 315. The open/close status of each of P13 from the port P11 in the three-way valve 330 is controlled by ECU 20. By switching the open/close status of each of P13 from the port P11, the flow path of the cooling fluid in the heat dissipation circuit 300 is switched.

The water pump 360 is provided on the flow path 370 between the three-way valve 330 and the condensing portion 241. The valve 340 is provided in the flow path 380. The check valve 350 is provided in the flow path 390. Specifically, the check valve 350 is provided between the downstream-side HT radiator 322 and the partial 390*a*. The check valve 350 restricts the flow of the cooling fluid from the partial 390*a* toward the downstream-side HT radiator 322.

FIG. 3 is an illustration when the port P11 and the port P13 are open and the port P12 is closed. In this instance, the cooling fluid of the heat dissipation circuit 300 flows through a first path of the water pump 360-three-way valve 330-upstream-side HT radiator 321-downstream-side HT radiator 322-check valve 350-subcooling unit 243-flow pipe 244-condensing portion 241-water pump 360 and a second path of the water pump 360-three-way valve 330-upstream-side HT radiator 321-valve 340-condensing portion 241-water pump 360.

As a result, the cooling fluid flowing through the first path is cooled by both the upstream-side HT radiator 321 and the downstream-side HT radiator 322, and then flows into the subcooling unit 243. As a result, the cooling fluid cooled to a relatively low temperature and the refrigerant in the refrigeration cycle 200 are heat-exchanged in the subcooling unit 243. As a result, it is possible to more effectively cool the refrigerant in the subcooling unit 243. Note that the temperature of the refrigerant in the subcooling unit 243 changes due to heat exchange with the cooling fluid.

In addition, unlike the first path, the cooling fluid flowing through the second path flows into the condensing portion 241 without passing through the downstream-side HT radiator 322 and the subcooling unit 243. As a result, the flow resistance of the cooling fluid can be reduced more than that of the first path, so that the flow rate (flow momentum and flow velocity) of the cooling fluid flowing into the condensing portion 241 can be relatively high. As a result, it is possible to suppress the temperature of the cooling fluid from being raised by the heat of condensation caused by the change of the refrigerant from the gas to the liquid in the condensing portion 241. As a result, the heat exchange efficiency between the cooling fluid and the refrigerant in the condensing portion 241 can be relatively high. In addition, since the flow rate of the cooling fluid flowing into the condensing portion 241 can be easily increased, the water pump 360 can be miniaturized.

Figure 4:
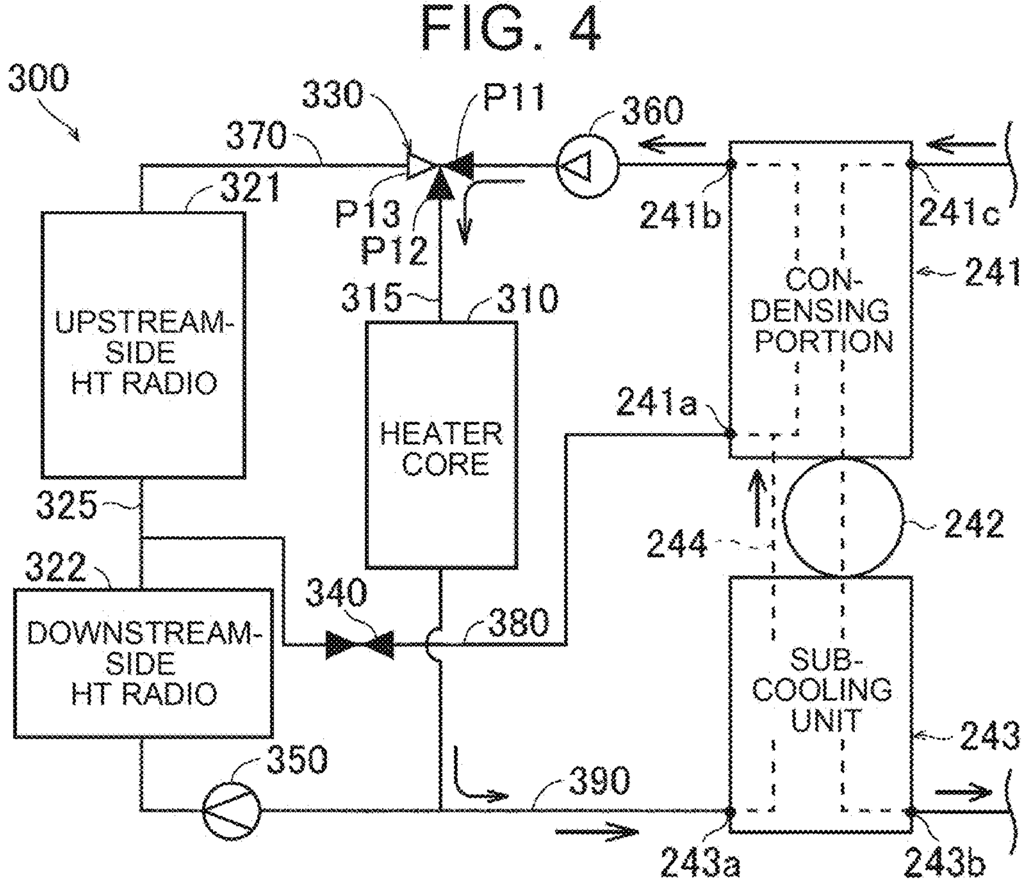
FIG. 4 is a diagram illustrating a second flow pattern of the heat dissipation circuit in the thermal management circuit according to the embodiment.

FIG. 4 shows a second flow pattern of the cooling fluid in the heat dissipation circuit 300. At this time, the port P13 of the three-way valve 330 is in the closed state, and the ports P11 and P12 are in the open state. In this case, the cooling fluid of the heat dissipation circuit 300 flows through the path of the water pump 360, the three-way valve 330, the heater core 310, the subcooling unit 243, the flow pipe 244, the condensing portion 241, and the water pump 360. The check valve 350 restricts the cooling fluid flowing through the heater core 310 from flowing toward the downstream-side HT radiator 322.

As a result, when the cooling fluid heat-exchanged in the water-cooled condenser 240 and heated passes through the heater core 310, the heat of the cooling fluid is used for heating. In addition, the coolant that is heat-exchanged and cooled in the heater core 310 flows from the subcooling unit 243 into the water-cooled condenser 240. Thus, since heat exchange is performed in each of the subcooling unit 243 and the condensing portion 241, it is possible to increase the amount of heat exchange (the amount of heat dissipation of the refrigerant) as compared with the case where the coolant flows from the condensing portion 241 into the water-cooled condenser 240.

Figure 5:
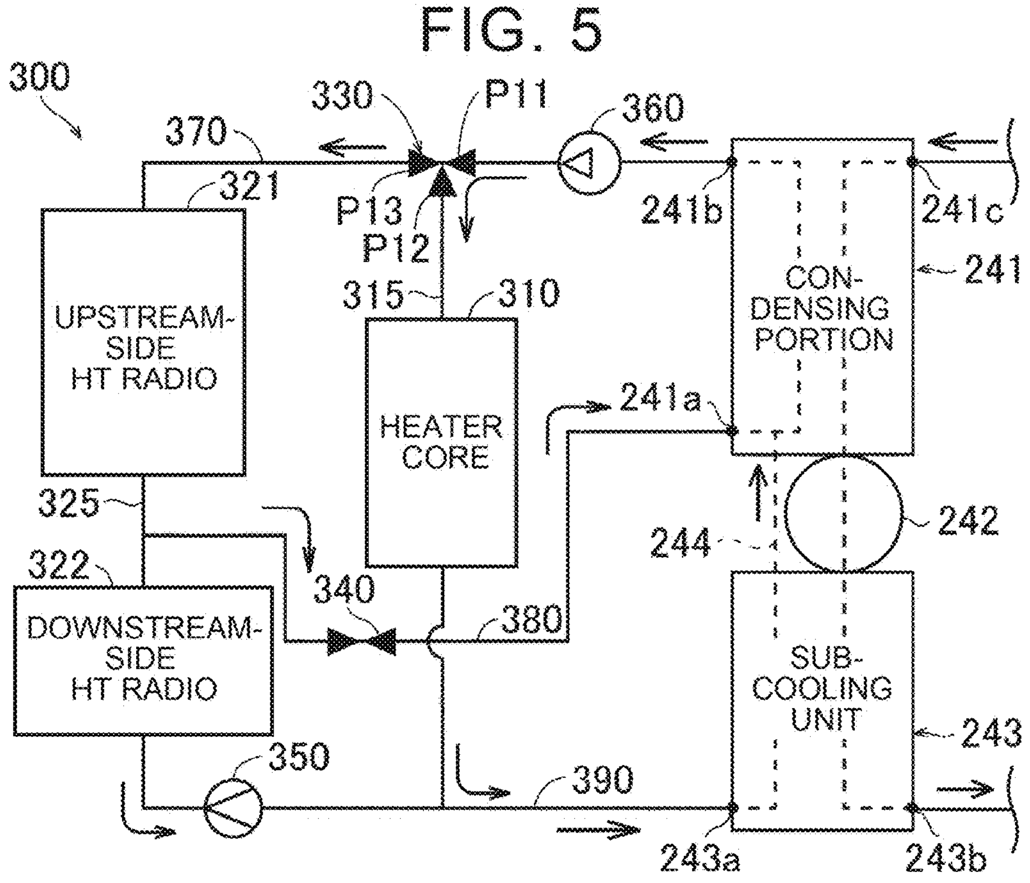
FIG. 5 is a diagram illustrating a third flow pattern of a heat dissipation circuit in a thermal management circuit according to an embodiment.

FIG. 5 is a diagram illustrating a third flow pattern of the cooling fluid in the heat dissipation circuit 300. At this time, P13 is open from the port P11 of the three-way valve 330.

Here, it is preferable that the opening degree of each of the port P12 and the port P13 of the three-way valve 330 is adjustable. Here, the ratio between the flow rate of the coolant flowing from the three-way valve 330 to the upstream-side HT radiator 321 and the flow rate of the coolant flowing from the three-way valve 330 to the heater core 310 can be adjusted. This makes it possible to adjust the cooling efficiency of the cooling fluid by the radiator portion 320 and the heating efficiency by the heater core 310. The opening degree of each of the port P12 and the port P13 is adjusted by ECU 20.

In addition, the valve 340 is preferably capable of adjusting the flow rate of the coolant passing through the valve 340. Specifically, the valve 340 may be capable of adjusting a channel diameter (for example, an opening degree of an opening) through which the coolant flows. As a result, the flow rate of the cooling fluid flowing from the upstream-side HT radiator 321 to the valve 340 is adjusted, so that the flow rate of the coolant flowing from the upstream-side HT radiator 321 to the downstream-side HT radiator 322 is adjusted. The flow rate of the coolant passing through the valve 340 is adjusted by ECU 20.

Referring back to FIG. 2, the downstream-side HT radiator 322 is disposed upstream of the upstream-side HT radiator 321 in the flow direction of the outside air flowing into the radiator portion 320. Specifically, the outside air flows into the interior of the vehicle from the grille 2*a* provided at the front end of electrified vehicle 2. Therefore, the downstream-side HT radiator 322 is disposed in front of the upstream-side HT radiator 321 in the front-rear direction of electrified vehicle 2. Further, when viewed from the front of electrified vehicle 2, the downstream-side HT radiator 322 may be disposed at a position where at least a part does not overlap with the upstream-side HT radiator 321. Thus, the outside air warmed by passing through the downstream-side HT radiator 322 can be suppressed from passing through the upstream-side HT radiator 321.

Figure 6:
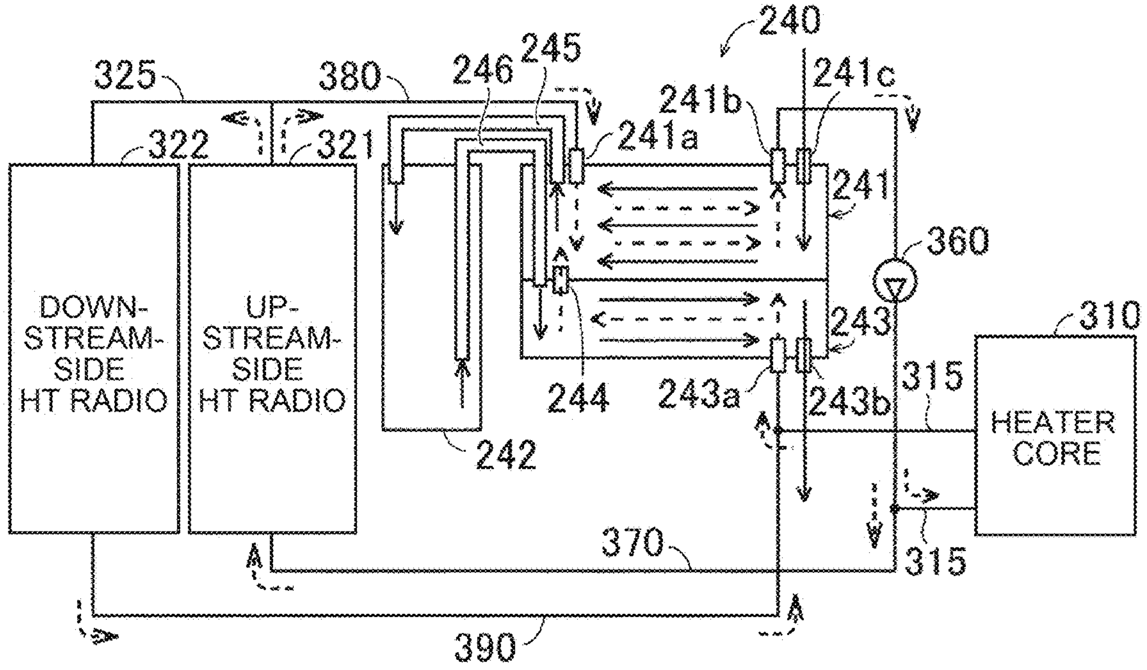
FIG. 6 is a diagram illustrating a detailed configuration of a water-cooled condenser according to an embodiment.

FIG. 6 is a diagram illustrating a detailed configuration of the water-cooled condenser 240. In FIG. 6, the flow of the cooling fluid in the heat dissipation circuit 300 is represented by a dashed arrow. The flow of the refrigerant in the refrigeration cycle 200 is indicated by a solid arrow.

As shown in FIG. 6, the condensing portion 241 and the subcooling unit 243 are provided so as to be stacked on each other. The water-cooled condenser 240 includes a flow pipe 245 and a flow pipe 246. The flow pipe 245 connects the condensing portion 241 and the receiver 242. The refrigerant flowing into the condensing portion 241 from the port 241*c* flows into the receiver 242 through the flow pipe 245. The flow pipe 246 connects the subcooling unit 243 and the receiver 242. The refrigerant flowing into the receiver 242 through the flow pipe 245 flows into the subcooling unit 243 through the flow pipe 246. The refrigerant flowing into the subcooling unit 243 through the flow pipe 246 flows out of the subcooling unit 243 through the port 243*b*.

As described above, in the present embodiment, the flow path 370 connects the port 241*b* of the condensing portion 241 and the upstream-side HT radiator 321, the flow path 380 branches from the flow path 325 and is connected to the port 241*a* of the condensing portion 241, and the flow path 390 connects the port 243*a* of the subcooling unit 243 and the downstream-side HT radiator 322. As a result, the flow rate of the cooling fluid flowing into the condensing portion 241 through the flow path 380 can be relatively increased. In addition, the temperature of the cooling fluid flowing into the subcooling unit 243 through the flow path 390 can be relatively low. As a result, the amount of heat exchange between the cooling fluid and the refrigerant (the amount of heat dissipation of the refrigerant) in each of the condensing portion 241 and the subcooling unit 243 can be increased. As a result, the battery 110 can be efficiently cooled by using the heat-dissipated refrigerant.

Figure 7:
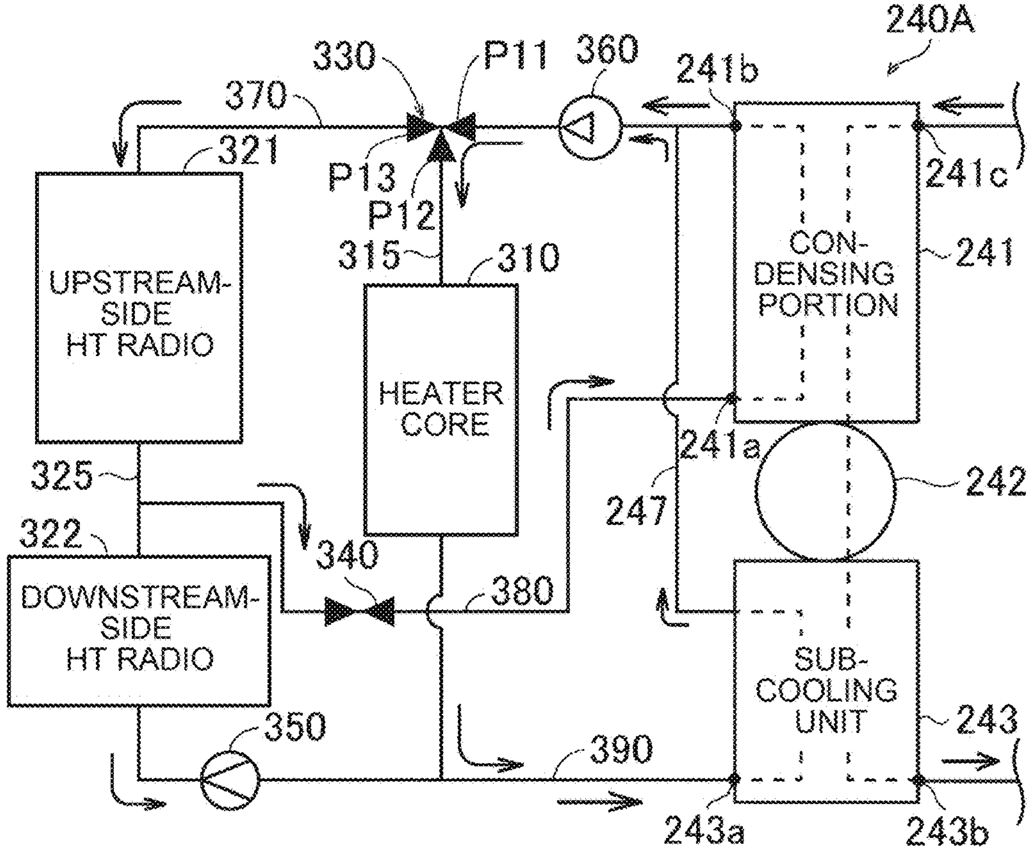
FIG. 7 is a diagram illustrating a heat dissipation circuit according to a first modification of the embodiment.

The water-cooled condenser 240A shown in FIG. 7 differs from the water-cooled condenser 240 in that it includes a flow path 247 instead of the flow pipe 244 of the water-cooled condenser 240. The flow path 247 connects the subcooling unit 243 and the flow path 370. Specifically, the flow path 247 connects the subcooling unit 243 and the flow path between the condensing portion 241 and the water pump 360. The cooling fluid of the heat dissipation circuit 300 flows from the subcooling unit 243 to the flow path 370 through the flow path 247. In this configuration, the cooling fluid flowing from the three-way valve 330 to the heater core 310 does not pass through the condensing portion 241 but flows into the flow path 370 through the flow path 247.

Figure 8:
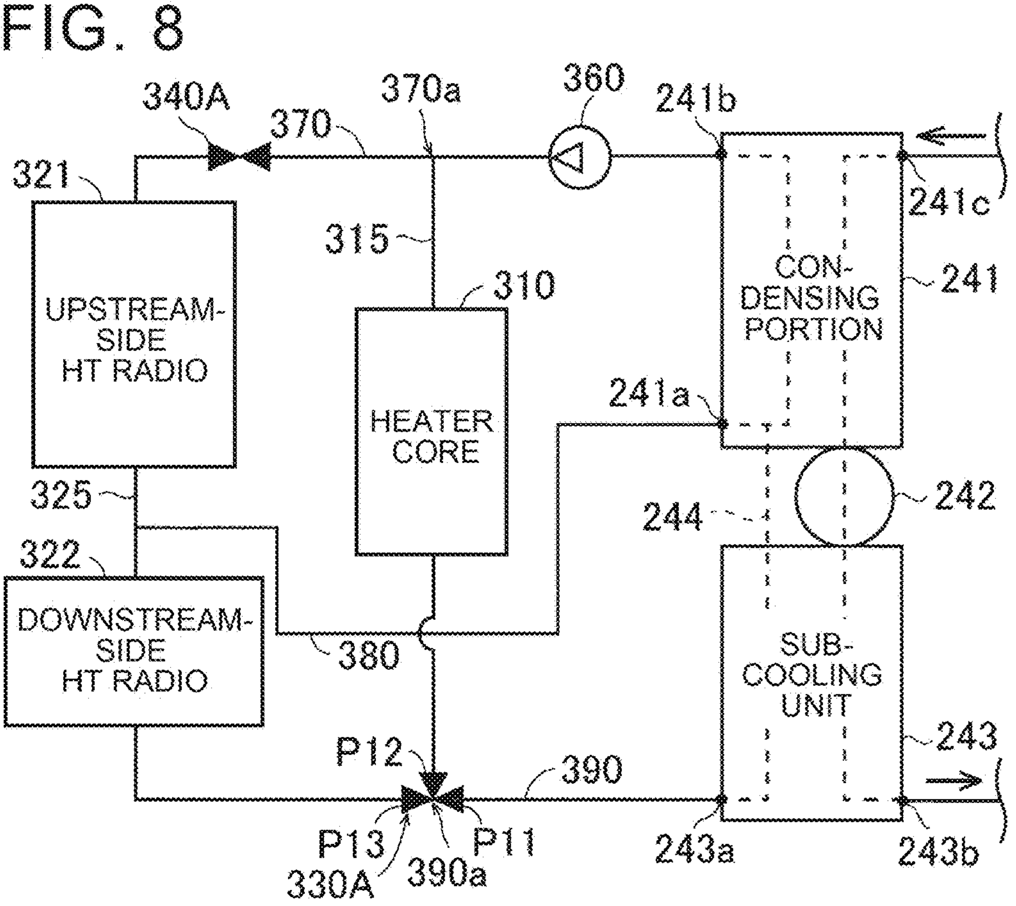
FIG. 8 is a diagram illustrating a heat dissipation circuit according to a second modification of the embodiment.

In the embodiment illustrated in FIG. 8, a three-way valve 330A is disposed on a partial 390*a* of the flow path 390 instead of the three-way valve 330. In addition, instead of the valve 340, a valve 340A is disposed in the flow path between the partial 370*a* in the flow path 370 and the upstream-side HT radiator 321. The three-way valve 330A and the valve 340A have the same configuration as the three-way valve 330 and the valve 340, respectively. In this configuration, when the valve 340A is in the closed state and only the port P13 of the three-way valve 330A is in the closed state, the cooling fluid flows through the path of the water pump 360-the heater core 310-the three-way valve 330A-subcooling unit 243-the condensing portion 241-the water pump 360. When the valve 340A is opened and only the port P12 of the three-way valve 330A is closed, the cooling fluid flows through the water pump 360, the valve 340A-upstream-side HT radiator 321, the downstream-side HT radiator 322, the three-way valve 330A-subcooling unit 243, the flow pipe 244, the condensing portion 241, the first path of the water pump 360, the water pump 360, the valve 340A-upstream-side HT radiator 321, the condensing portion 241, and the second path of the water pump 360. The three-way valve 330A and the valve 340A are exemplary of the "second valve" and the "first valve", respectively.

Figure 9:
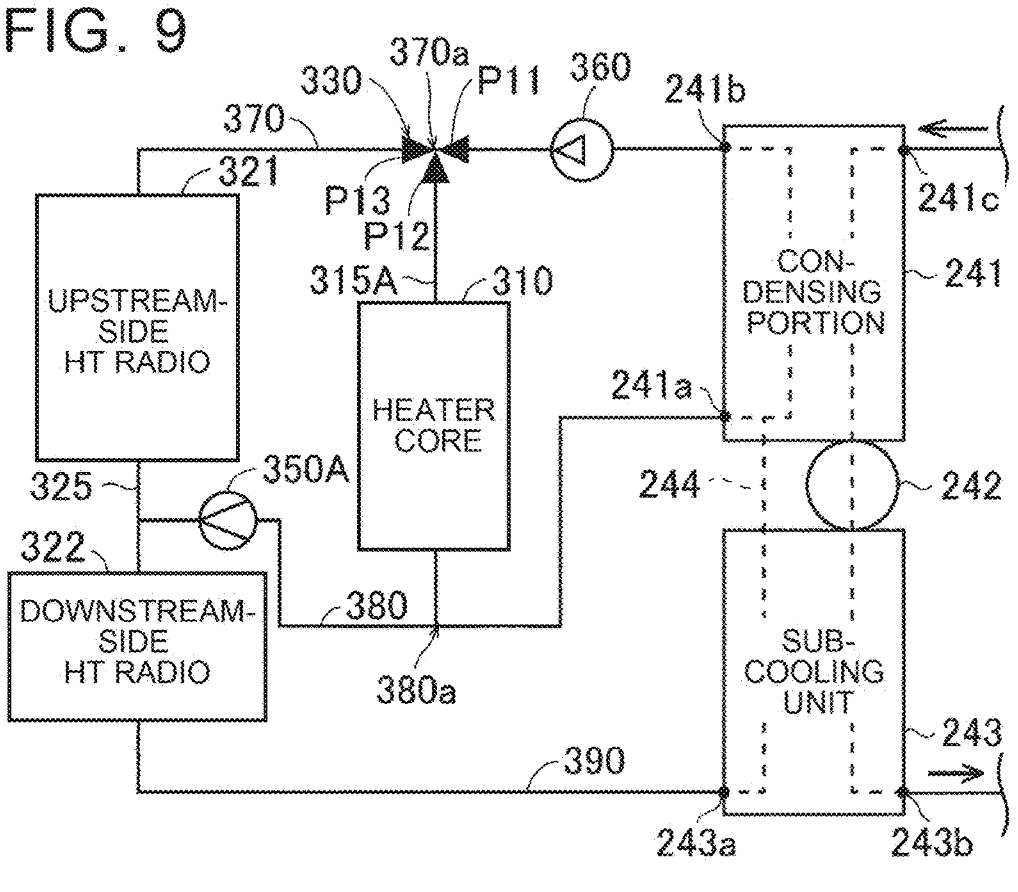
FIG. 9 is a diagram illustrating a heat dissipation circuit according to a third modification of the embodiment.

In the embodiment shown in FIG. 9, the heater core 310 is provided in the flow path 315A that connects the partial 370*a* of the flow path 370 and the partial 380*a* of the flow path 380. In the embodiment shown in FIG. 9, instead of the check valve 350, a check valve 350A is disposed between the flow path 325 and the partial 380*a*. The check valve 350A restricts the cooling fluid flowing from the three-way valve 330 to the heater core 310 from flowing toward the flow path 325. In this configuration, the cooling fluid flowing from the three-way valve 330 to the heater core 310 does not pass through the subcooling unit 243 but flows into the condensing portion 241. The flow path 315A and the check valve 350A are exemplary of the "fourth flow path" and the "second valve", respectively.

Figure 10:
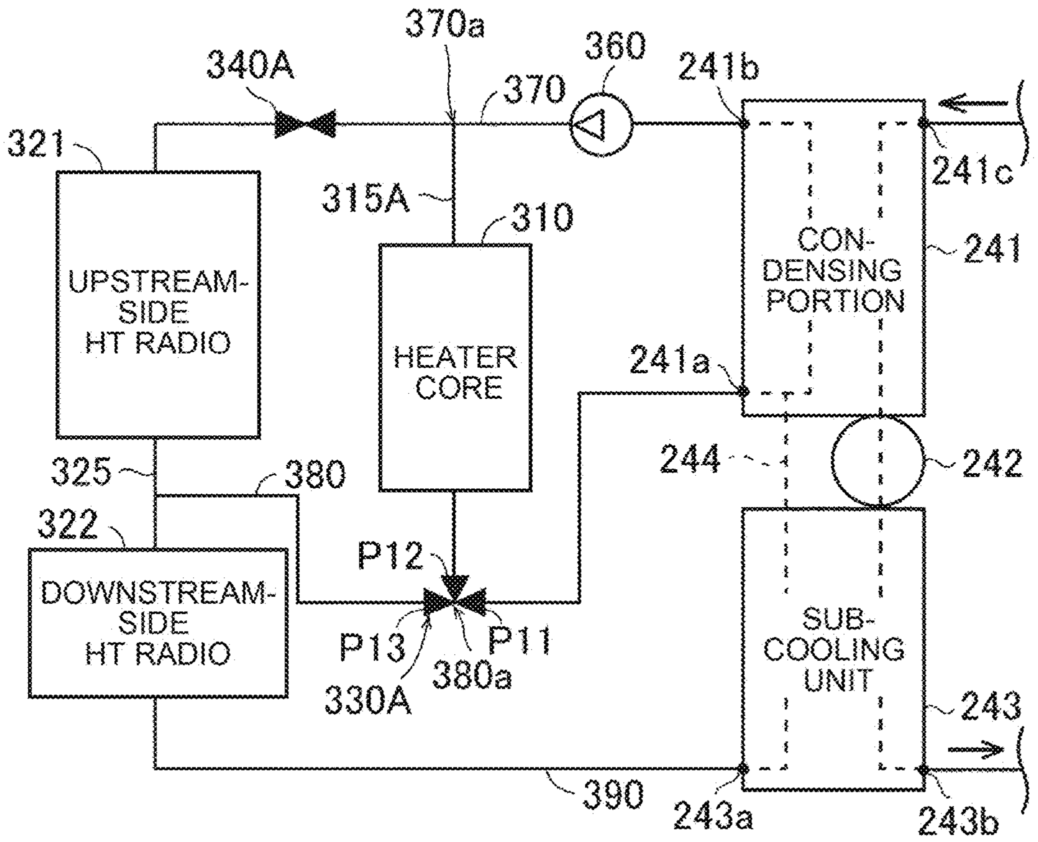
FIG. 10 is a diagram illustrating a heat dissipation circuit according to a fourth modification of the embodiment.

FIG. 10 is a modification of the example shown in FIG. 9. In the embodiment illustrated in FIG. 10, a valve 340A is disposed between the partial 370*a* and the upstream-side HT radiator 321 in the flow path 370. Further, the three-way valve 330A is disposed on the partial 380*a* of the flow path 380. When the valve 340A is in the closed state and only the port P13 of the three-way valve 330A is in the closed state, the cooling fluid flows through the path of the water pump 360, the heater core 310, the three-way valve 330, the condensing portion 241, and the water pump 360. When the valve 340A is opened and only the port P12 of the three-way valve 330A is closed, the cooling fluid flows through the first path of the water pump 360-valve 340A-upstream-side HT radiator 321-downstream-side HT radiator 322-subcooling unit 243-flow pipe 244-condensing portion 241-water pump 360, and the second path of the water pump 360-valve 340A-upstream-side HT radiator 321-three-way valve 330A-condensing portion 241-water pump 360.

Figure 11:
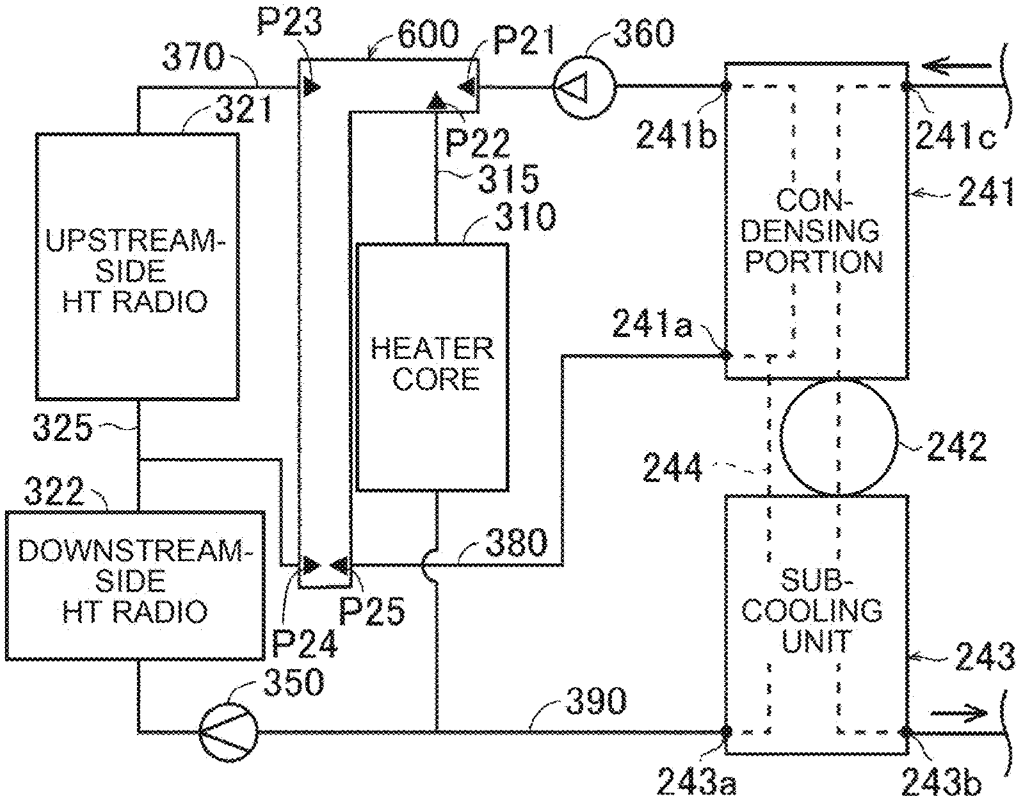
FIG. 11 is a diagram illustrating a heat dissipation circuit according to a fifth modification of the embodiment.

FIG. 11 differs from the above embodiment in that a five-way valve 600 is provided instead of the three-way valve 330 and the valve 340. The five-way valve 600 has a configuration in which the three-way valve 330 and the valve 340 are integrally formed. The five-way valve 600 has ports P21 to P25. The port P21 is an inlet port through which the cooling fluid from the condensing portion 241 (water pump 360) flows. The port P22 is an outlet port through which the cooling fluid flows out to the flow path 315 toward the heater core 310. The port P23 is an outlet port through which the cooling fluid flows out to the flow path 370 toward the upstream-side HT radiator 321. The port P24 is an inlet port through which the cooling fluid flowing through the flow path 380 (the cooling fluid from the upstream-side HT radiator 321) flows. The port P25 is an outlet port through which the cooling fluid flows out to the flow path 380 toward the condensing portion 241. The five-way valve 600 has both the function of the "first valve" and the function of the "second valve" of the present disclosure.

FIGS. 12A to 12E are diagrams illustrating a detailed configuration of the five-way valve 600. As shown in FIGS. 12A to 12E, the five-way valve 600 includes a main body portion 610, a valve body 620, and a valve body 630. The main body portion 610 is connected to P25 from the port P21 and houses the valve body 620 and the valve body 630. Are arranged around the main body portion 610, the port P21, port P22, port P5, port P24, clockwise in the order of the port P23. The valve body 620 and the valve body 630 rotate integrally within the main body portion 610. As a result, the valve body 620 and the valve body 630 are closed (from P21 to P25). As a result, the flow path of the cooling fluid is switched. The rotational angles of the valve body 620 and the valve body 630 can be controlled by ECU 20 by a predetermined angle (for example, 1 degree).

Each of the valve body 620 and the valve body 630 has a sector shape. The valve body 620 and the valve body 630 are disposed so as to face each other in a state in which their distal ends are overlapped with each other. As a result, the internal space of the main body portion 610 is divided into two spaces by the valve body 620 and the valve body 630. The center angle θ1 of the valve body 620 is smaller than the center angle θ2 of the valve body 630.

Figure 12A:
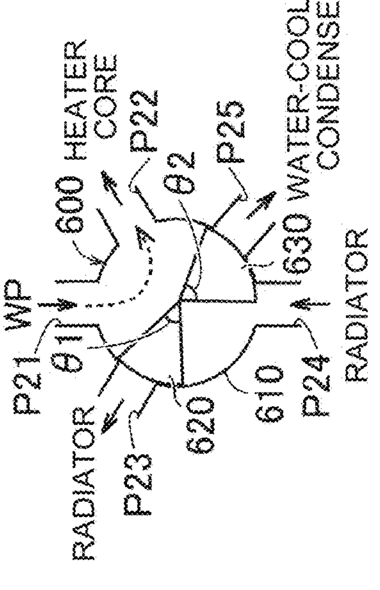
FIG. 12A is a diagram showing a detailed configuration of a five-way valve of FIG. 11 and is a diagram when supplying heat to the heater core.

FIG. 12A is a diagram illustrating a condition of the five-way valve 600 when heat is supplied to the heater core 310. In the embodiment shown in FIG. 12A, the port P23 is closed by the valve body 620, and the port P25 is closed by the valve body 630. The cooling fluid flowing into the five-way valve 600 from the port P21 flows out from the port P22 toward the heater core 310.

Figure 12B:
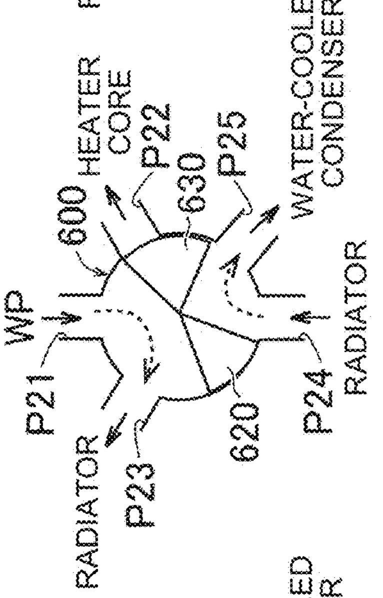
FIG. 12B is a diagram showing a detailed configuration of the five-way valve of FIG. 11, where heat is supplied to the radiator.
Figure 12C:
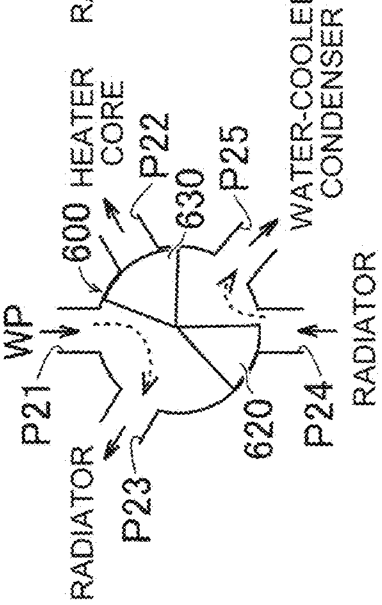
FIG. 12C is a diagram showing a detailed configuration of the five-way valve of FIG. 11, where heat is supplied to the radiator.

FIGS. 12B and 12C illustrate the condition of the five-way valve 600 when supplying heat to the radiator. In the embodiment shown in FIG. 12B, the port P22 is closed by the valve body 630. The cooling fluid flowing into the five-way valve 600 from the port P21 flows out from the port P23 toward the upstream-side HT radiator 321. Further, the cooling fluid flowing into the five-way valve 600 from the port P24 flows out from the port P25 toward the water-cooled condenser 240 (condensing portion 241).

In the embodiment shown in FIG. 12C, the port P22 is blocked by the valve body 630, and a part of the port P24 is blocked by the valve body 620. Accordingly, the flow rate of the cooling fluid flowing from the port P24 to the port P25 is limited as compared with the case of FIG. 12B.

Figure 12D:
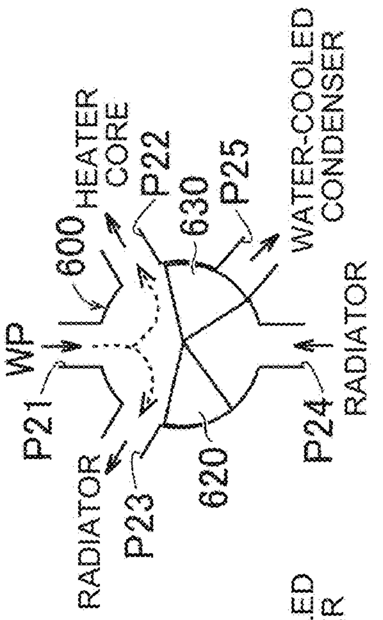
FIG. 12D is a diagram showing a detailed configuration of a five-way valve of FIG. 11, and is a diagram when heat is supplied to a heater core and a radiator.
Figure 12E:
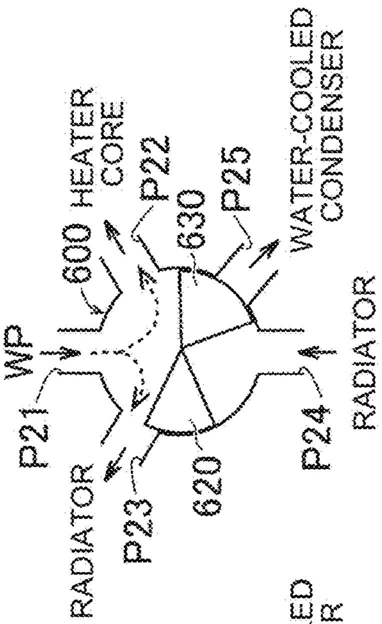
FIG. 12E is a diagram showing a detailed configuration of a five-way valve of FIG. 11 and is a diagram when supplying heat to the heater core and the radiator.

FIGS. 12D and 12E illustrate the condition of the five-way valve 600 when heat is supplied to each of the heater core 310 and the radiator. In the embodiment shown in FIG. 12D, the port P25 is closed by the valve body 630. The cooling fluid flowing into the five-way valve 600 from the port P21 flows out of the five-way valve 600 through each of the port P23 and the port P22.

In the embodiment shown in FIG. 12E, the port P25 is blocked by the valve body 630, and a part of the port P23 is blocked by the valve body 620. Accordingly, the flow rate of the cooling fluid flowing from the port P21 to the port P23 is limited as compared with the case of FIG. 12D.

In the above embodiment, the thermal management circuit 10 is mounted on electrified vehicle 2, but the present disclosure is not limited thereto. The thermal management circuit 10 may be mounted on an electrical equipment other than electrified vehicle (for example, a stationary power storage device).

In the above-described embodiment, an example has been described in which the battery 110 is cooled by the cooling fluid that is heat-exchanged between the refrigerant in the refrigeration cycle 200 and the chiller 210, but the present disclosure is not limited thereto. Instead of cooling the battery 110 with the cooling fluid that is heat-exchanged with the refrigerant in the chiller 210, equipment other than the battery 110 (e.g., eAxle 410 and engines) may be cooled.

In the above-described embodiment, the heater core 310 is provided in the heat dissipation circuit 300, but the present disclosure is not limited thereto. The heat dissipation circuit 300 may not be provided with the heater core 310 (and the flow path 315). In this case, the check valve 350 may not be provided in the flow path 390.

In the above embodiment, the valve 340 is provided in the flow path 380, but the present disclosure is not limited thereto. The valve 340 may not be provided in the flow path 380.

In the above embodiment, the downstream-side HT radiator 322 is provided in front of the upstream-side HT radiator 321 in the front-rear direction of electrified vehicle 2. The positional relation between the downstream-side HT radiator 322 and the upstream-side HT radiator 321 is not limited to the above embodiment. For example, the downstream-side HT radiator 322 and the upstream-side HT radiator 321 may be arranged side by side in the left-right direction of electrified vehicle 2. In other words, the downstream-side HT radiator 322 and the upstream-side HT radiator 321 may be arranged side by side in a direction intersecting (perpendicular to) the flow direction of the air flowing into the radiator portion 320.

The configuration of the modification of the above-described embodiment illustrated in FIGS. 7 to 12E may be combined with each other.

The embodiment disclosed herein should be considered as illustrative and not restrictive in all respects. The scope of the present disclosure is shown by the claims, rather than the above embodiments, and is intended to include all modifications within the meaning and the scope equivalent to those of the claims.

What is claimed is:

1. A thermal management circuit installed in electrical equipment, the thermal management circuit comprising:

a first circuit, through which flows a cooling fluid that is subjected to heat exchange with cooling-object equipment that is equipment to be cooled;

a refrigeration cycle including a chiller and a water-cooled condenser, and also through which flows a refrigerant that is subjected to heat exchange in the chiller with the cooling fluid flowing through the first circuit; and a second circuit including a radiator portion, and also through which flows a cooling fluid that is subjected to heat exchange in the water-cooled condenser with the refrigerant flowing through the refrigeration cycle, wherein the second circuit includes a first flow path, a second flow path, and a third flow path, each connected to the water-cooled condenser, the water-cooled condenser includes a condensing portion and a supercooling portion, the radiator portion includes an upstream-side radiator and a downstream-side radiator that are connected in series with each other in the second circuit, the first flow path connects an outlet port of the cooling fluid in the condensing portion, and the upstream-side radiator, the second flow path branches from a flow path connecting the upstream-side radiator and the downstream-side radiator, and connects to an inlet port of the cooling fluid in the condensing portion, and the third flow path connects an inlet port of the cooling fluid in the supercooling portion, and the downstream-side radiator.

2. The thermal management circuit according to claim 1, wherein the downstream-side radiator is disposed upstream from the upstream-side radiator in a flow direction of outside air flowing into the radiator portion.

* * * * *